March 25, 1958     W. L. HUNSICKER     2,827,704

APPARATUS FOR SPACING CROP ROWS

Filed April 21, 1954

INVENTOR.
Walton L. Hunsicker
BY
ATTORNEY.

United States Patent Office 2,827,704
Patented Mar. 25, 1958

2,827,704

APPARATUS FOR SPACING CROP ROWS

Walton L. Hunsicker, Hatfield, Mo.

Application April 21, 1954, Serial No. 424,561

2 Claims. (Cl. 33—46)

This invention relates to the planting of agricultural crops, and refers more particularly to an apparatus for spacing crop rows at a uniform distance and in parallel relationship throughout the field.

As is known to those engaged in the practice of agriculture, the proper spacing and the maintenance of a parallel relationship between the crop rows in a field has long proved a difficult problem. Normally such rows are formed in two-row or four-row groups by a planter which is drawn along behind a tractor. Attempts at laying the rows of adjacent groups in parallel relationship have in the past been confined in the main to two methods. The first, and probably the more prevalent, involves the use of drag markers which are secured to opposite sides of the planter and which extend laterally therefrom. At the outer end of each marker is a small furrow making device which engages the ground and plows up a small furrow as the tractor travels through the field. This marking or guide furrow is spaced at a uniform distance from the outside of the row group then being formed, and on the return trip the operator centers the tractor on the guide furrow. The drawbacks to the use of this method are also well known, the primary one being that the marking device imposes considerable extra draft on the tractor and also requires special attention of the operator to insure that adequate marking is taking place. Both of these factors decrease the speed of planting to a considerable extent.

The second method in use is less accurate and even less desirable than the first. It is practiced without the drag marker, and constitutes basically an attempt to maintain the rear wheel of the tractor at an estimated uniform spacing laterally from the track of the tractor made during planting of the last row group. As will be evident, however, the spacing cannot be maintained with any uniformity by this method. An additional problem is created by the fact that the operator's attention is continually focused on the ground immediately adjacent the rear wheel. Should large stones or other objects lie immediately in the path of the tractor, there is the serious danger that they will not be observed soon enough to forestall damage to the equipment. Moreover, to maintain any degree of accuracy whatever in the spacing of the rows, the operator is required to drive at a low speed so that careful observation and comparison can be made.

It is a primary object of the present invention to overcome the foregoing difficulties by providing an apparatus to be used in performing a method of row crop spacing in which the outside row of the preceding row group is utilized as the reference line for the next group of rows. The method contemplates the establishment of a sighting point forwardly of the operator's seat and to one side of the center line of the tractor below the level of the operator's eye, and establishment of a line of sight through the sighting point which intersects the outside row of the preceding group. By maneuvering the tractor as it advances to hold the line of sight in intersecting relation with the row, the row group then being formed by the planter will be accurately maintained at a uniform spacing from the guide row. The line of sight is directed forwardly of the tractor, and permits adequate survey at the same time of the ground which is being approached.

Another and also very important object of my invention is to provide novel apparatus for practicing my method. In this connection, it is an object of the invention to provide, in combination with a conventional tractor, a sighting element offset to one side of the center line of the tractor and located forwardly of the operator's seat and below the eye level of the operator.

A further object of the invention is to provide the combination of tractor and sighting element in which the sighting element is selectively adjustable toward and away from the side of the tractor, and also adjustable in height.

Still another object of the invention is the provision of a sighting element having a novel conformation which permits extremely accurate sighting with a minimum of interference with the vision of the operator. In this connection, it is also an object to provide a novel construction for a gravity controlled sight which can be utilized to compensate for tilting of the tractor when operating along a side hill incline.

A further object of the invention is to provide a sighting device adapted for attachment to conventional tractors and embodying the features hereinbefore and hereinafter set forth.

Other and further objects, together with the features of novelty appurtenant thereto, will appear in the course of the following description.

In the accompanying drawings which form a part of and are to be read in conjunction with the specification, and in which like reference numerals indicate like parts in the various views, Fig. 1 is a perspective view of tractor and planter showing a portion of the field being planted, the tractor being equipped with a preferred embodiment of my sighting device;

Figure 1:
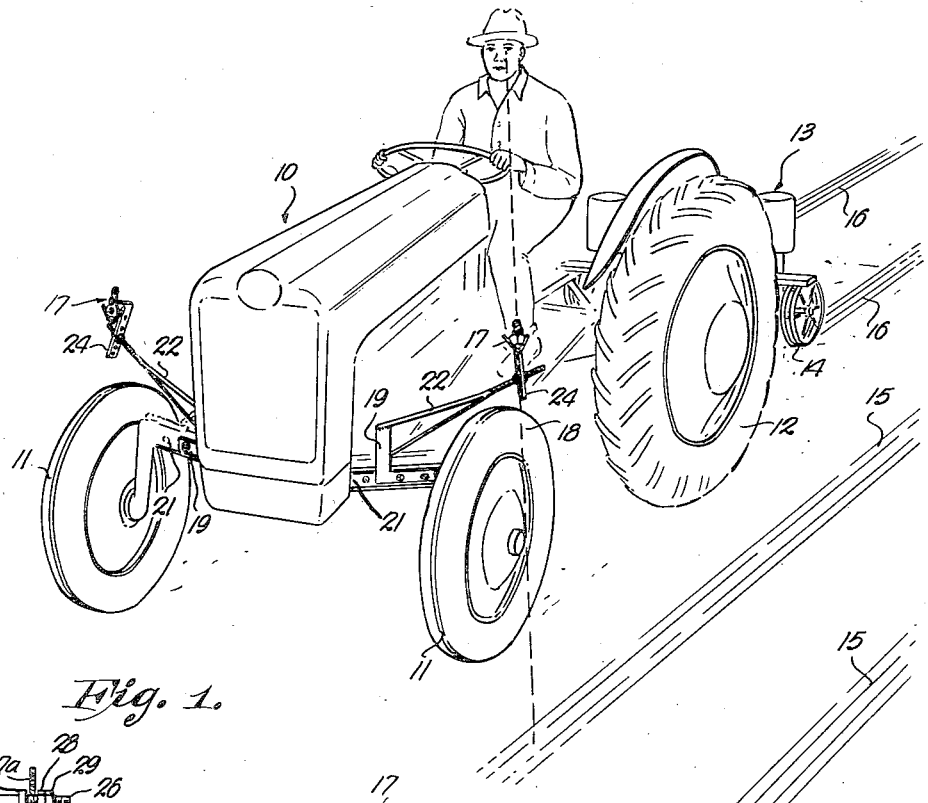

Referring to the drawing, and particularly to Fig. 1, reference numeral 10 indicates generally a conventional tractor having front wheels 11 and rear wheels 12. Drawn behind the tractor in the usual fashion is a row type planter 13 having wheels 14. In the illustrated embodiment the planter is of the two-row type.

The tractor 10 is shown as traveling along a group of rows 15 which has been formed on a previous trip of the tractor and planter, and the rows being presently formed are indicated at 16. It will be understood that the specific types of tractor and planter shown in the drawing are illustrative only, and that my invention can be performed with other types of equipment serving the same purpose.

In the practice of my method, one of the novel and important features is the use of the outside row of the rows 15 as the reference line for establishing the proper spacing and alignment of the next succeeding rows during travel of the planter through the field. To take advantage of the row as a reference line, the operator establishes a sighting point, generally indicated by reference numeral 17, located forwardly and to one side of the operator and below the level of the eye. Using this sighting point as a reference, the operator then maneuvers the tractor laterally until the sight line 18 from his eye over the sighting point 17 intersects the outside row 15. By maintaining this intersection as the tractor proceeds through the field, the planter 13 forms rows 16 which are parallel to the preceding rows 15 and spaced at the desired distance therefrom.

It will be evident that the spacing between succeeding rows is determined, for any particular operator, by the location of the sighting point 17 relative the eye of the operator. For example, if the rows are desired at a closer spacing, the sighting point 17 is moved inboard or downward from its original position; if a wider spacing is sought, the sighting point is moved outward or upward. A combination of the vertical and lateral movement may also be employed to obtain the same results, and this is actually the preferable practice, since it permits the widest range of spacings with a minimum movement of the sighting point.

Frequently, it is necessary to plant crops on side hill inclines, and my method provides valuable advantages in this situation. As the tractor travels along a side hill incline, the planter tends to orient itself into a path offset downhill from the center line of the tractor path. This is due, of course, to the effect of gravity. The result is that if the operator maintains the tractor spaced at the same distance from the preceding row as it is when operating on level ground, the rows then being formed will be spaced at a greater distance from the preceding row than would happen in the level part of the field. Ordinarily, however, it is desired to maintain the spacing on the side hill equal to that on the level, and my method makes this possible. As the tractor tips to one side, the natural tendency of the operator is to maintain his torso and head at true vertical. Measured relative the tractor, this means that the operator is inclined toward the uphill side and that his eyes are located to one side of the original level ground position. The line of sight over the sighting point 17 will therefore shift to a more acute angle with respect to the center line of the tractor and will intersect the ground at a point closer to the tractor. The result is that when operating on the side hill incline, to maintain the line of sight on the preceding row requires that the operator keep the tractor closer to the preceding row than when planting the level part of the field. I have found that the change in spacing of the tractor from the guide row is substantially equal to the offset of the planter from the tractor path, and therefore that the spacing of the planter rows from the preceding rows is maintained substantially the same on the side hill as on the level. This is true regardless of the angle of inclination of the hill.

Figure 2:
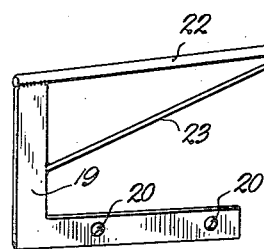
Fig. 2 is an enlarged perspective view of the sighting device seen in Fig. 1.

An important feature of my invention resides in the provision of an attachment for conventional tractors which can be utilized to advantage in establishing a sighting point for practicing the method disclosed herein. One preferred form of the attachment is illustrated in Figs. 1 and 2. In this particular embodiment, the attachment comprises a generally L-shaped bracket member 19 having suitable apertures 20 in one leg for bolting the bracket to the axle 21 of the tractor. Welded or otherwise secured to the upper end of the other leg is a laterally extending rod or arm 22, and a diagonal brace 23 is provided for strengthening the connection of the arm with the bracket. As shown, the outer end of arm 22 is bent slightly to bring it into a plane substantially normal to the line of sight 18 from the operator and is threaded throughout a major portion of its length.

Positioned on the outer end of arm 22 and carried thereby is an elongated sight support or cross member 24. Member 24 is provided with a plurality of spaced apertures 24a of a diameter slightly greater than the diameter of the threaded portion of arm 22 and adapted to slidably fit therewith. The member 24 is releasably secured to the arm by a pair of nuts 25 on opposite sides thereof which when tightened toward one another clamp member 24 in a fixed angular and longitudinal relationship with the arm.

Aligned with the upper end of the sight support member 24 and secured thereto is the sight support shaft 26. The shaft is provided intermediate its ends with a bearing shoulder 26a and rotatably received on the shaft is a swingable sight 27. A clamping nut 28 and lock nut 29 are threaded on shaft 26, and can be adjusted to clamp the sight 27 in a fixed angular position with respect to the shaft or to leave it free for swinging movement.

As is evident from the drawing, the sight 27 comprises a plate-like member having a row of apertures 27a, any one of which is adapted to slidably fit with the shaft 26. One end of the plate is of greater width than the other, and secured to the larger end is a generally U-shaped rod 27b whose ends extend outwardly at diverging angles from the plate. The weight distribution of the sight is such that regardless of which aperture 27a is used for mounting the sight on shaft 26, the sight will, when freely swingable, orient itself in the position shown in the drawings, that is, with the U-shaped element 27b below the shaft 26. The projecting ends of the rod 27b serve as centering references for the sight line 18, and combined with the relatively narrow plate member hanging from the shaft 26, provide a sight in which there is a minimum of interference with visibility of guide row 15.

The manner of construction of my sighting attachment permits a wide range of adjustment to accommodate operators of different height and also provides a wide range within which the spacing can be changed. Not only is the member 24 adjustable in or out on the arm 22, but also the height of the sight can be altered by adopting one of the other apertures 24a for connection with the arm. A second, and finer, vertical adjustment can be made by selecting one of the other apertures 27a for connection with shaft 26, and also by inverting the sight 27 and clamping it in the inverted position with nuts 28 and 29.

For fields which are only slightly rolling, I have found that by leaving the sight 27 freely swingable on shaft 26, any tilt of the tractor is compensated for by a corresponding swing of the sight to remain at true vertical disposition.

Figure 4:
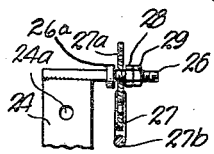
Fig. 4 is a section taken along the line 4—4 of Fig. 2.
Figure 3:
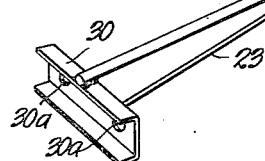
Fig. 3 is a modified form of the sighting device.

A modification of the attachment is shown in Fig. 3. The construction of the arm 22, brace 23, cross member 24, shaft 26, and sight element 27 is identical with that of the arrangement shown in Figs. 1, 2 and 4. The only distinction from the latter embodiment resides in the provision of a U-shaped mounting bracket 30 to which the arm 22 and brace 23 are secured instead of the L-shaped bracket 19. The member 30 is provided with apertures 30a, and instead of being formed for attachment to the axle of the tractor, is adapted for direct connection with the frame by means of bolts (not shown) through these apertures. The embodiment shown in Fig. 3 is employed on row crop tractors which, as is known to those in the art, do not have the spread front wheels and hence no axle for mounting of the sighting attachment.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A row crop spacing attachment for tractors comprising a footing element adapted to be secured to the frame of the tractor, an arm carried by said footing element and extending in a sidewise direction to one side of and above the wheels of the tractor, an apertured cross member slidably mounted on the outer portion of said arm, said cross member provided with a plurality of apertures in vertical spaced relation, each adapted to slidably fit with said arm, releasable means for selectively locking said cross member at a desired position lengthwise of said arm, and a sighting member carried by said cross member.

2. A row crop spacer attachment for tractors comprising an arm adapted to be secured to the tractor at a point forward of the operator's feet, the arm extending in a sidewise direction with respect to the center line of the tractor and having a length such that the arm extends laterally beyond the front wheel of the tractor, an upright cross member mounted on said arm, said cross member being adjustable up and down and in and out on said arm, and a sight carried by said cross member, said sight including a member pivotally connected with said cross member for free swinging movement about an axis substantially parallel with the center line of said tractor.

References Cited in the file of this patent

UNITED STATES PATENTS

| | | |
|---|---|---|
| 340,128 | Kersey | Apr. 20, 1886 |
| 637,939 | Murray | Nov. 28, 1899 |
| 834,030 | Sutton | Oct. 23, 1906 |
| 1,126,393 | Chrisco | Jan. 26, 1915 |
| 1,194,460 | Yocum | Aug. 15, 1916 |
| 1,373,852 | Allen | Apr. 5, 1921 |
| 1,541,456 | Wilson | June 9, 1925 |
| 1,609,734 | Meyers | Dec. 7, 1926 |
| 2,198,864 | Degrelle | Apr. 30, 1940 |
| 2,384,466 | Hickey | Sept. 11, 1945 |
| 2,483,011 | Hudson | Sept. 27, 1949 |
| 2,538,112 | Maier | Jan. 16, 1951 |
| 2,555,954 | Bruflat | June 5, 1951 |
| 2,580,954 | Przybylski | Jan. 1, 1952 |
| 2,753,439 | Greenfield | July 3, 1956 |